(12) United States Patent
Kato (10) Patent No.: US 6,941,865 B2
(45) Date of Patent: Sep. 13, 2005

(54) PROCESSING FOR REASSIGNING PRINT JOBS FOLLOWING PRINT ERROR IN DISTRIBUTED PRINTING

(75) Inventor: Kazunori Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 09/981,821

(22) Filed: Oct. 19, 2001

(65) Prior Publication Data

US 2002/0048476 A1 Apr. 25, 2002

(30) Foreign Application Priority Data

Oct. 23, 2000 (JP) ......................................... 2000-323039
Oct. 10, 2001 (JP) ......................................... 2001-313037

(51) Int. Cl.<sup>7</sup> ............................................... B41J 11/44
(52) U.S. Cl. ......................... 101/484; 400/61; 400/70; 400/76
(58) Field of Search ......................... 101/484; 400/61, 400/70, 76

(56) References Cited

U.S. PATENT DOCUMENTS

| | | | | |
|---|---|---|---|---|
| 5,625,757 A | * | 4/1997 | Kageyama et al. | 358/1.14 |
| 5,881,212 A | * | 3/1999 | Morita | 358/1.13 |
| 6,452,692 B1 | * | 9/2002 | Yacoub | 358/1.15 |
| 6,529,286 B1 | * | 3/2003 | King | 358/1.14 |
| 2002/0089692 A1 | * | 7/2002 | Ferlitsch | 358/1.15 |

FOREIGN PATENT DOCUMENTS

JP          09309243 A  * 12/1997 ............ B41J/21/00

* cited by examiner

Primary Examiner—Minh Chau
(74) Attorney, Agent, or Firm—Fitzpatrick, Cella, Harper & Scinto

(57) ABSTRACT

When a single print job is divided into a plurality of distributed jobs and the distributed jobs are printed using a plurality of printers, whether any of the plurality of printers is abnormal is detected. If at least one of the printers is abnormal, at least part of the distributed job that was to be printed by the abnormal printer is assigned to another printer by control that facilitates the collection and sorting of the printouts produced by the printers.

10 Claims, 11 Drawing Sheets

PROCESSING FOR REASSIGNING PRINT JOBS FOLLOWING PRINT ERROR IN DISTRIBUTED PRINTING

FIELD OF THE INVENTION

This invention relates to a printing system in which printing is performed by distributing a print job among a plurality of printers or a plurality of devices such as copiers having a printer function.

BACKGROUND OF THE INVENTION

In a distributed printing system known in the art, a single print job that requires the printing of a plurality of pages or a plurality of copies is printed by being assigned to a plurality of printers or to a plurality of devices such as copiers having a printer function (these devices shall be referred to as "printers" below) connected to a network. Using such a distributed printing system makes it possible to print a plurality of pages at high speed.

In a conventional distributed printing system, however, it is difficult for the user to ascertain which printer will print out information and how the information will be printed out. As a consequence, when all pages cannot be printed owing to a problem such as depletion of paper in a printer for distributed printing, the pages of the printed matter become mixed and out of sequence if reprinting is carried out by changing the destination of print data from the faulty printer to a normal printer automatically. As a result, collecting the printouts and putting them in the proper order becomes a difficult task.

SUMMARY OF THE INVENTION

The present invention has been made in consideration of the situation described above and an object thereof is to provide a distributed printing system for performing distributed printing by a plurality of printers or devices having a printer function, wherein the system is controlled in such a manner that printouts can be collected and put into proper order easily even in a case where a problem has occurred in any of the printers or devices during printing.

According to the present invention, the foregoing object is attained by providing an information processing apparatus comprising: recognition means for recognizing a status of a printing apparatus; and decision means for, in a case of assigning at least a part of a print job which is assumed to be printed by the printing apparatus to another printing apparatus in accordance with the status recognized by the recognition means, deciding the other printing apparatus in accordance with a paper ejection type of the other printing apparatus.

According to the present invention, the foregoing object is also attained by providing a printing system for performing printing by controlling a plurality of printing apparatuses comprising: recognition means for recognizing a status of a printing apparatus among the plurality of printing apparatuses; and decision means for, in a case of assigning at least a part of a print job which is assumed to be printed by the printing apparatus to another printing apparatus in accordance with the status recognized by the recognition means, deciding the other printing apparatus in accordance with a paper ejection type of the other printing apparatus.

Further, the foregoing object is attained by providing a control method comprising: a recognition step of recognizing a status of a printing apparatus; and a decision step of, in a case of assigning at least a part of a print job which is assumed to be printed by the printing apparatus to another printing apparatus in accordance with the status recognized in the recognition step, deciding the other printing apparatus in accordance with a paper ejection type of the other printing apparatus.

Furthermore, the foregoing object is also attained by providing a control method of a printing system which performs printing by controlling a plurality of printing apparatuses comprising: a recognition step of recognizing a status of a printing apparatus among the plurality of printing apparatuses; and a decision step of, in a case of assigning at least a part of a print job which is assumed to be printed by the printing apparatus to another printing apparatus in accordance with the status recognized in the recognition step, deciding the other printing apparatus in accordance with a paper ejection type of the other printing apparatus.

Further, the foregoing object is also attained by providing a computer readable program including instructions for controlling the processor to carry out any of the foregoing methods.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE PREFERRED EMBODIMENT

A preferred embodiment of the present invention will be described in detail in accordance with the accompanying drawings.

<First Embodiment>

Figure 1:
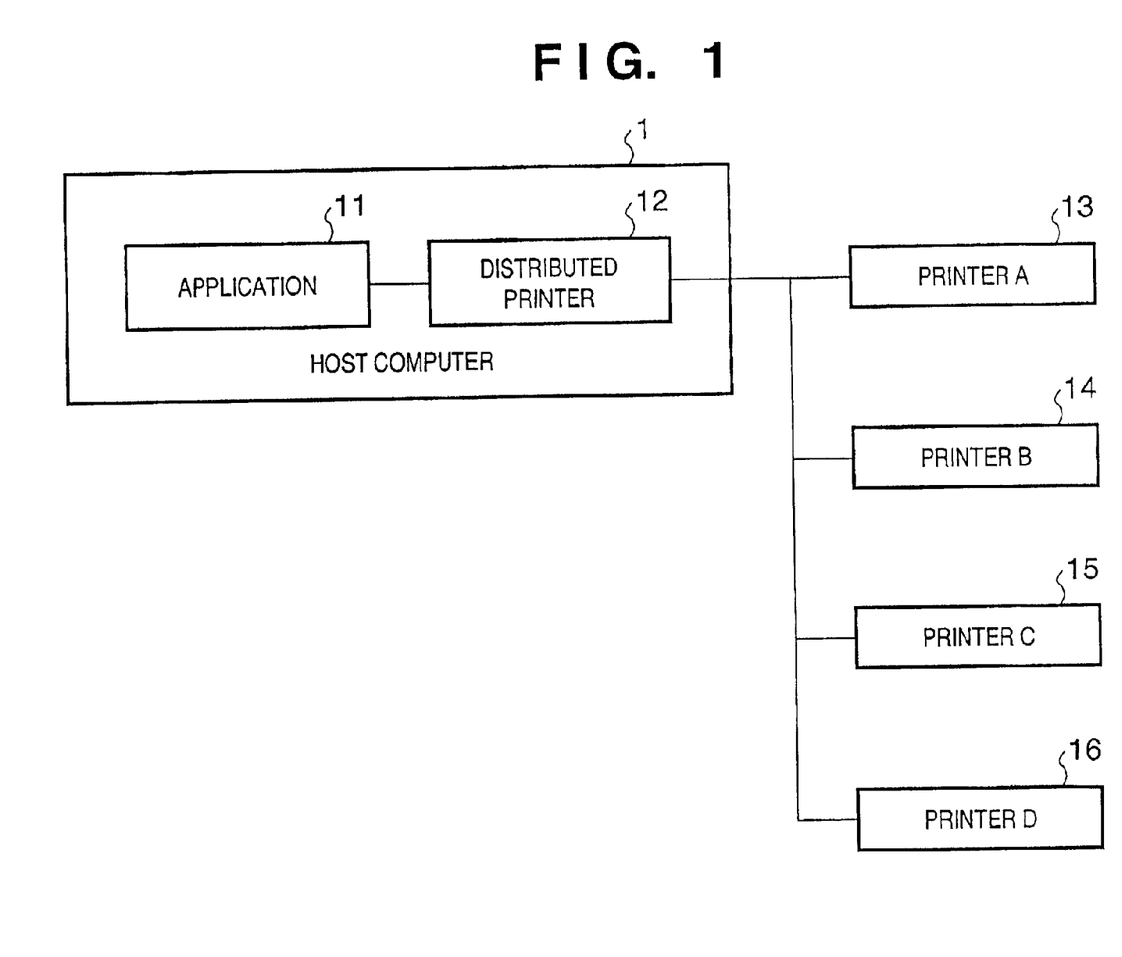
FIG. 1 is a block diagram illustrating the configuration of a distributed printing system according to an embodiment of the present invention.

FIG. 1 is a block diagram illustrating the configuration of a distributed printing system according to an embodiment of the present invention. As shown in FIG. 1, the system includes a host computer 1 serving as an information processing apparatus according to the present invention. The host computer 1 runs an application program 11 for executing printing and includes a virtual distributed printer 12 that accepts a print request from the application program 11. The output destinations of the virtual distributed printer 12 are physical printers 13 to 16. The output destinations may have been set beforehand by an administrator or user, or may be set by the user as the need arises when a print request is issued. Though four printers have been set as the distributed printers in this implementation, the number of printers is not limited to this. Further, as printers in the present invention, a variety of printers, such as printer adopting electrophotographing method, ink-jet method, thermal transfer method may be used. Furthermore, printers incorporated within a facsimile machine, a digital composite apparatus, and so on, may be also used in the present invention. Further, the application program 11 and the virtual distributed printer 12 need not be installed in the same personal computer; the virtual distributed printer 12 may exist on the side of a print server and the application program 11 may exist on the side of a print client. By delivering a file from the application program 11 to the virtual distributed printer 12 in an intermediate-file format such as a metafile via an operating system, a specific page can be extracted from the intermediate file and various methods can be applied as methods of dealing with printer malfunctions.

Distributed printing processing described in this embodiment is executed by performing printing by having the application program 11 specify the virtual distributed printer 12 as a print-destination printer.

Figure 2:
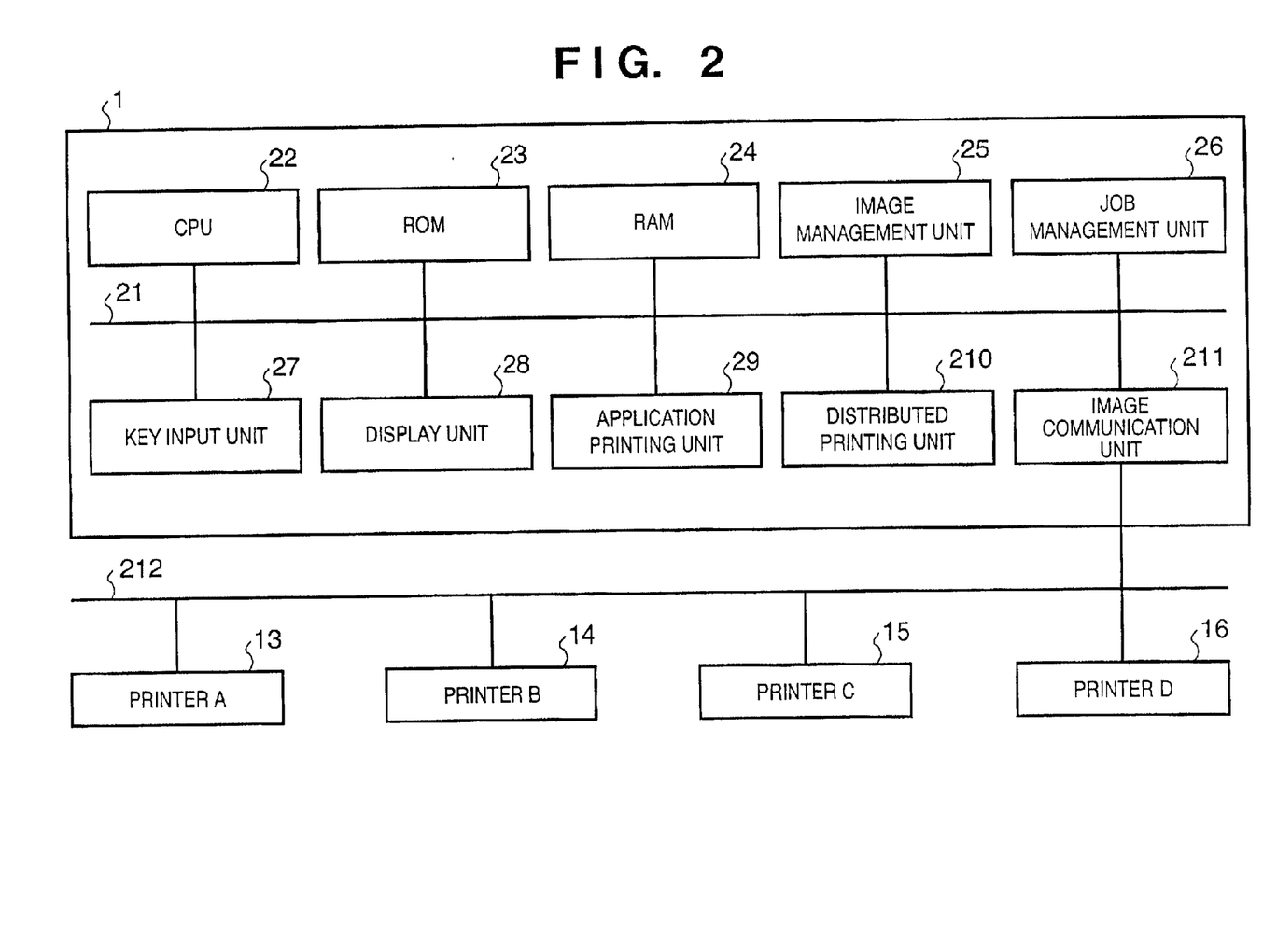
FIG. 2 is a block diagram illustrating the components of the distributed printing system according to this embodiment.
Figure 3:
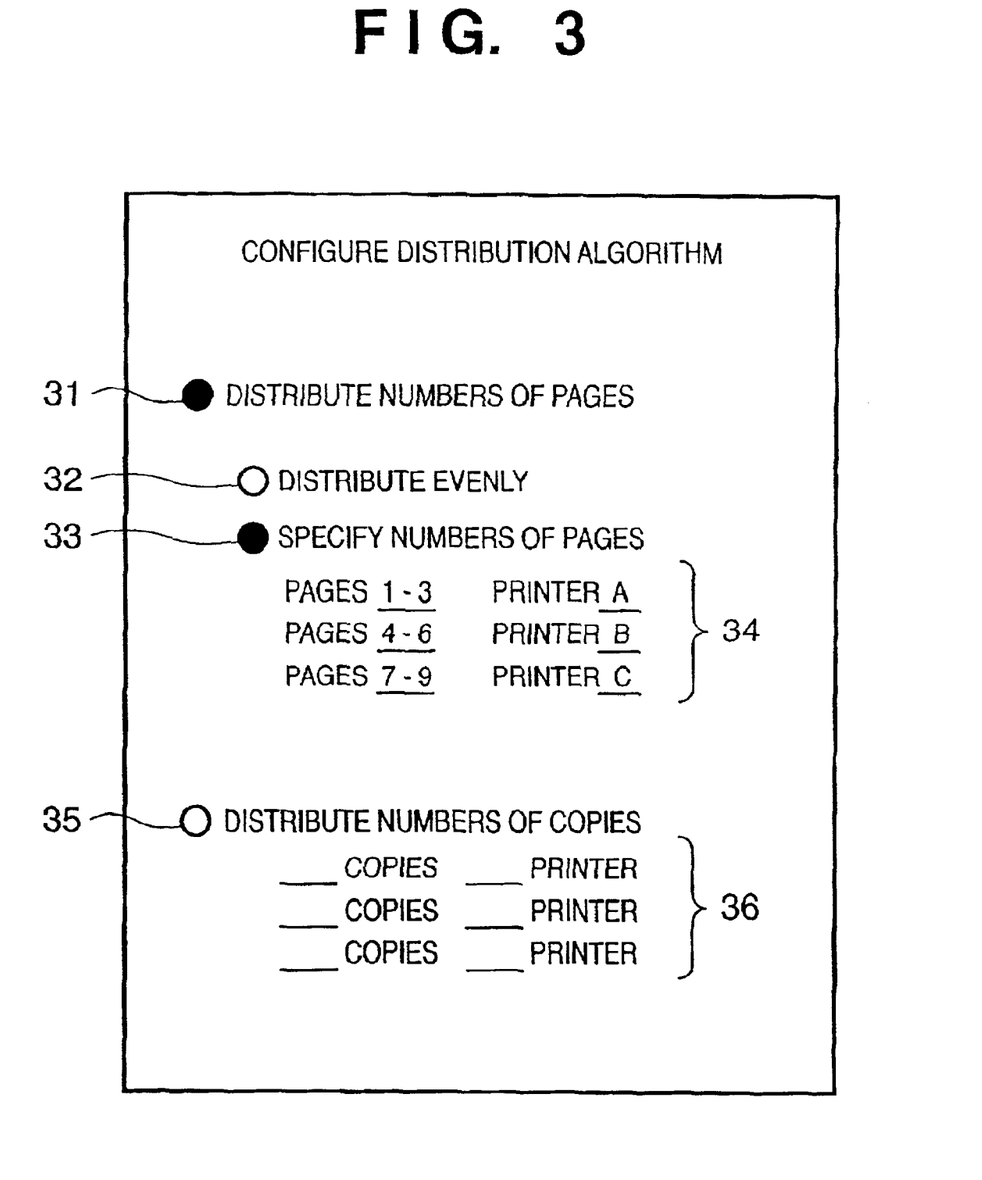
FIG. 3 is a diagram showing an example of a screen for configuring a distribution algorithm in this embodiment.
Figure 4:
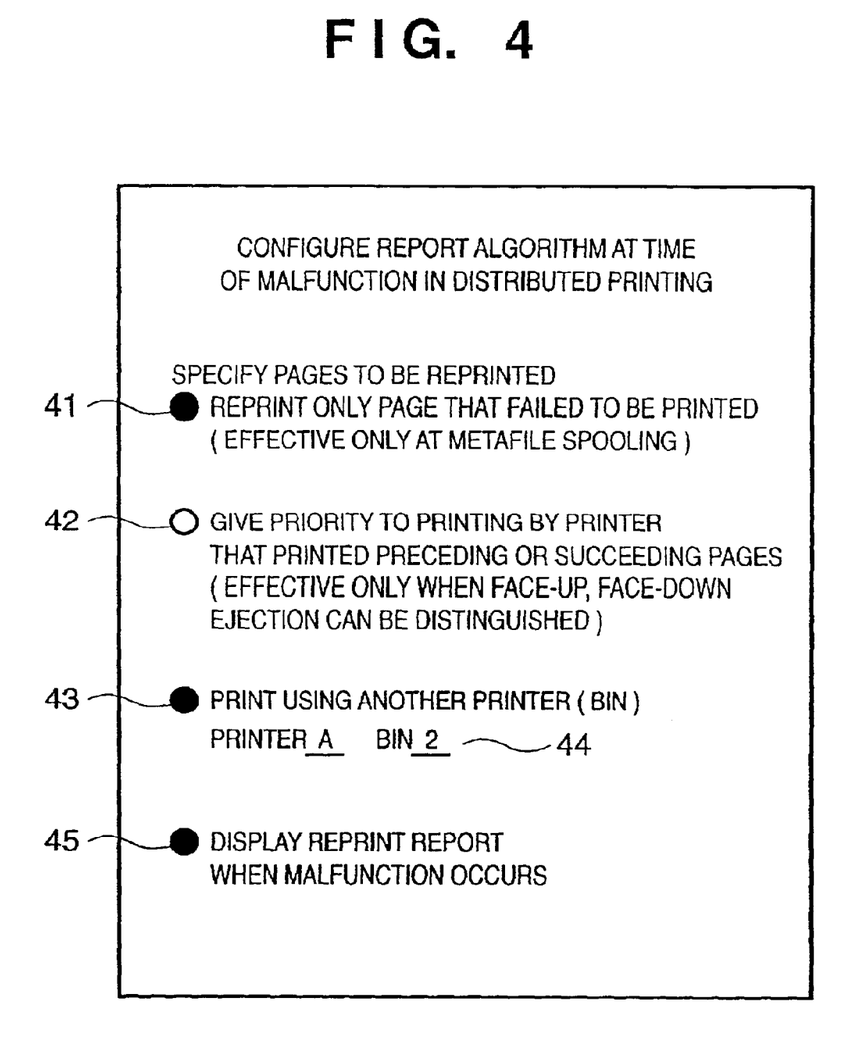
FIG. 4 is a diagram showing an example of a screen for configuring a reprint algorithm when a malfunction occurs in this embodiment.

FIG. 2 is a block diagram useful in describing the internal structure of the host computer 1 in the distributed printing system according to this invention. FIG. 2 combines hardware blocks and functional processing blocks in order to simplify the description. The host computer 1 includes a system bus 21, a CPU 22 for performing overall system control, a ROM 23 to which control code of the distributed printing processing of this invention executed by the CPU 22 has been written, a RAM 24 and an image management unit 25 in which intermediate files such as RAW or EMF formatted files are stored. A job management unit 26 constituted by a functional block (provided by a module constituting part of the distributed printing program) monitors printer status, acquires information indicating that a print job has been performed normally or, if a malfunction has occurred during printing, information indicating the page number up to which printing was performed, and notifies a distributed printing unit 210 when a malfunction has been detected. The distributed printing unit 210 also is implemented by a functional block. The host computer 1 further includes a key input unit 27 by which the user operates keys, and a display unit 28, such as a CRT. The display unit 28 displays the content of job management, allowing the user to perform the necessary operations. It should be noted that the content displayed on the display unit 28 practically corresponds to the content based on image information for user interface, included in a control program of the present invention, displayed via an operating system. FIGS. 3 and 4 (will be described later) are examples of such displayed contents.

The host computer 1 further includes an application printing unit 29 and the distributed printing unit 210, which corresponds to the virtual distributed printer 12 of FIG. 1. Both of these are modules in the functional block diagram. The application printing unit 29 receives a print request from the application program 11 and delivers print data to the image management unit 25. The latter delivers the print request to the distributed printing unit 210 if the request is for distributed printing. If the print request is received from the application printing unit 29, the distributed printing unit 210 delivers a distributed printing output to registered printers in accordance with a stored distribution algorithm. Here the print data is received from the image management unit 25 and, if necessary, the print data is reconstructed and the reconstructed print data is output (reassigned) upon being converted to a print job capable of being interpreted by the printer that is to print the data using a printer driver, which is not shown. The print job thus obtained by the conversion consists of printer language such as Page Description Language. If printer malfunction (as the status of the printer) is reported by the job management unit 26, reprint processing is executed based upon a stored algorithm for executing reprint at the time of malfunction. Note, the printer malfunction indicates the status of the printer when the printer can not continue printing, and includes depletion of paper, memory overflow, power off, shortage of expendables such as toner, communication error, program error, and so on. The job management unit 26 recognizes the printer status such as the foregoing conditions of the printer, and print control program of the present invention causes a variety of distributed printing controls in accordance with the printer status recognized (managed) by the job management unit 26. An image communication unit 211 allows the host computer 1 to communicate with a printer and carries out protocol control of a LAN. A LAN line 212 connects the host computer 1 to a printer (A) 13, a printer (B) 14, a printer (C) 15 and a printer (D) 16. Upon receiving a distributed-print request from the application printing unit 29, the distributed printing unit 210 decides which of the printers A to D are to be used for printing and delivers print data (a print instruction) to the printer drivers that correspond to the printers decided.

FIG. 3 is a diagram illustrating an example of a screen output to the display unit 28 for configuring a distribution algorithm. The screen displays an item 31 ("DISTRIBUTE NUMBERS OF PAGES") for setting the numbers of pages to be printed in distributed fashion. If item 31 has been selected, then it becomes possible to select either an item 32 ("DISTRIBUTE EVENLY"), which automatically sets equal numbers of pages to be printed by the distributed printers, or an item 33 ("SPECIFY NUMBERS OF PAGES"), which enables the user to set at will the number of pages to be printed by each distributed printer. A setting area 34 is used if item 33 ("SPECIFY NUMBERS OF PAGES") has been selected. An item 35 ("DISTRIBUTE NUMBERS OF COPIES") is for setting numbers of necessary copies to be printed in distributed fashion if a plurality of copies are to be produced by printing. If item 35 ("DISTRIBUTE NUMBERS OF COPIES") is selected, then the number of copies to be printed by each distributed printer can be set at will in a setting area 36. The distributed printing unit 210 reconstructs the print data (the print instruction) in such a manner that the set numbers of pages or numbers of copies will be printed by the specified printers. The distributed printing unit 210 delivers print data to each of the printer drivers to thereby generate a plurality of distributed print jobs.

In the example illustrated in FIG. 3, numbers of pages for distributed printing have been set and printers A, B and C have been designated to print pages 1 to 3 pages 4 to 6 and pages 7 to 9, respectively, in distributed fashion.

FIG. 4 is a diagram illustrating an example of a screen output to the display unit 28 for configuring a reprint algorithm at the time of malfunction.

First, when reprint is performed at the time of malfunction, the user specifies which pages are to be printed. In the example of FIG. 4, only the page for which printing failed owing to malfunction has been designated for reprinting (item 41). This designation is metafile spooled and is effective only in a case where a file in an intermediate-file format is generated. If the designation is not a metafile spool, all pages that were to be printed by the malfunctioning printer are reprinted. In a case where stapling is performed automatically using the stapling function of a printer, item 41 would not be selected. For example, the item 41 may be displayed with a pale color, and no input for setting the item 41 may be accepted.

Next, the printer to be used for reprinting is designated. To accomplish this, the screen displays an item 42, which is for specifying reprint by the printer that printed the pages preceding those of the faulty printer or succeeding those of the faulty printer. If this item is selected, priority is given to an attempt at reprint by the printer that printed the pages that preceded or followed the printing failure. This reprint method is effective only when it is possible to discriminate whether the printer that printed the pages preceding or succeeding the page that was to be output to the malfunctioning printer ejects paper face-up or face-down.

The preceding pages and succeeding pages will be explained in more detail. When a range of pages is given among a plurality of ranges of pages obtained by dividing whole pages to be printed, the "preceding pages" indicate pages preceding to the given range of pages. For example, the preceding pages of "pages 4~6" in the setting area 34 in FIG. 3 are "pages 1~3". Similarly, when a range of pages is given among a plurality of ranges of pages obtained by dividing the whole pages to be printed, the "succeeding pages" indicate pages succeeding to the given range of pages. For example, the succeeding pages of "pages 4~6" in the setting area 34 in FIG. 3 are "pages 7~9".

Note, there are cases that the pages which the malfunctioning printer is to print include the first or final page of the whole job, and the preceding or succeeding pages may indicate a range pages other than the range of pages as described above. These cases will be described later in detail, and the detailed explanation is omitted here.

If application of such a reprint scheme is inappropriate, or if item 43 has been selected, reprint is carried out using another printer and bin not selected as a printer for distributed printing. Area 44 makes it possible to designate any printer and bin as the destination for the reprint operation.

A setting item 45 is for selecting whether or not to display a report relating to reprint at the time of a malfunction. If item 45 has been selected, then, in the event of a malfunction, which printer malfunctioned and which page was reprinted at which printer and in which bin is displayed on display unit 28. If reprint also fails, then which page failed to be reprinted is displayed on the display unit 28.

Next, processing for distributed printing according to the embodiment of the present invention will be described.

FIGS. 5 to 8 are flowcharts useful in describing processing for distributed printing according to this embodiment of the present invention. Reference will be had to these flowcharts to describe the processing in detail. The processing indicated by these flowcharts is implemented by the CPU 22 of the information processing apparatus (host computer), which executes the processing based upon control code in the distributed-print program of the present invention. (The program has been stored in ROM 23 or on a storage medium described later.)

If the CPU 22 senses at step S51 that a print request has been issued from the printing unit of application program 11 to the virtual distributed printer 12, the application printing unit 29 judges that this print request is that of a distributed-print job and delivers the print request to the distributed printing unit 210 via the image management unit 25. Next, at step S52, the distributed printing unit 210 divides up the print instruction, namely the print request, in accordance with the distribution setting that has been made by the virtual distributed printer 12 (i.e., the job is divided into distributed print jobs). The divided print instructions are delivered to the printer drivers corresponding to the printers to that are to perform distributed printing, and print data for the distributed print jobs is generated. Conceivable methods that can be used are a generally known method of specifying the start page and end page of a PJL code instead of performing physical division of the file, and a generally known method of physically dividing the file, e.g., a method of dividing the job by binarizing the print instruction output by the application and physically dividing an EMF that has been spooled by the operating system.

The distributed jobs obtained by division at step S52 are transmitted from the virtual distributed printer 12 to the printers (distributed printers) specified among the printers 13 to 16 by the configuration screen shown in FIG. 3.

Next, the status of each distributed printer is acquired at step S54. For example, if printing by printers 13 to 15 has been specified, the status of each of printers 13 to 15 is acquired. A known example of a method of acquiring printer status is a protocol for acquiring printer status by SNMP or the like. It is then determined at step S55 whether the status of each of these distributed printers is normal. If a malfunctioning printer is found, control proceeds to step S63 in FIG. 6 and processing for executing reprint in the event of malfunction is executed.

If the status of all distributed printers is normal ("NO" at step S55), then it is determined at step S56 whether all printing has ended. This includes distributed jobs and reprint jobs in the event of malfunction. If there is a job that is not finished, control returns to step S54. If all jobs are finished, on the other hand, then control proceeds to step S57.

It is determined at step S57 whether printing ended normally without the occurrence of malfunction in distributed-print processing. If printed ended normally, then distributed-print processing is exited. If reprint was carried out owing to the occurrence of malfunction, control proceeds to step S58. If the setting area 45 in FIG. 5 was configured so as to display a malfunction reprint report ("YES" at step S58), control proceeds to step S59. If the setting area 45 was not so configured ("NO" at step S58), then distributed-print processing is exited. Step S59 calls for the creation of the malfunction reprint report. This is followed by step S510, at which the created report is displayed on the display unit 28.

Figure 5:
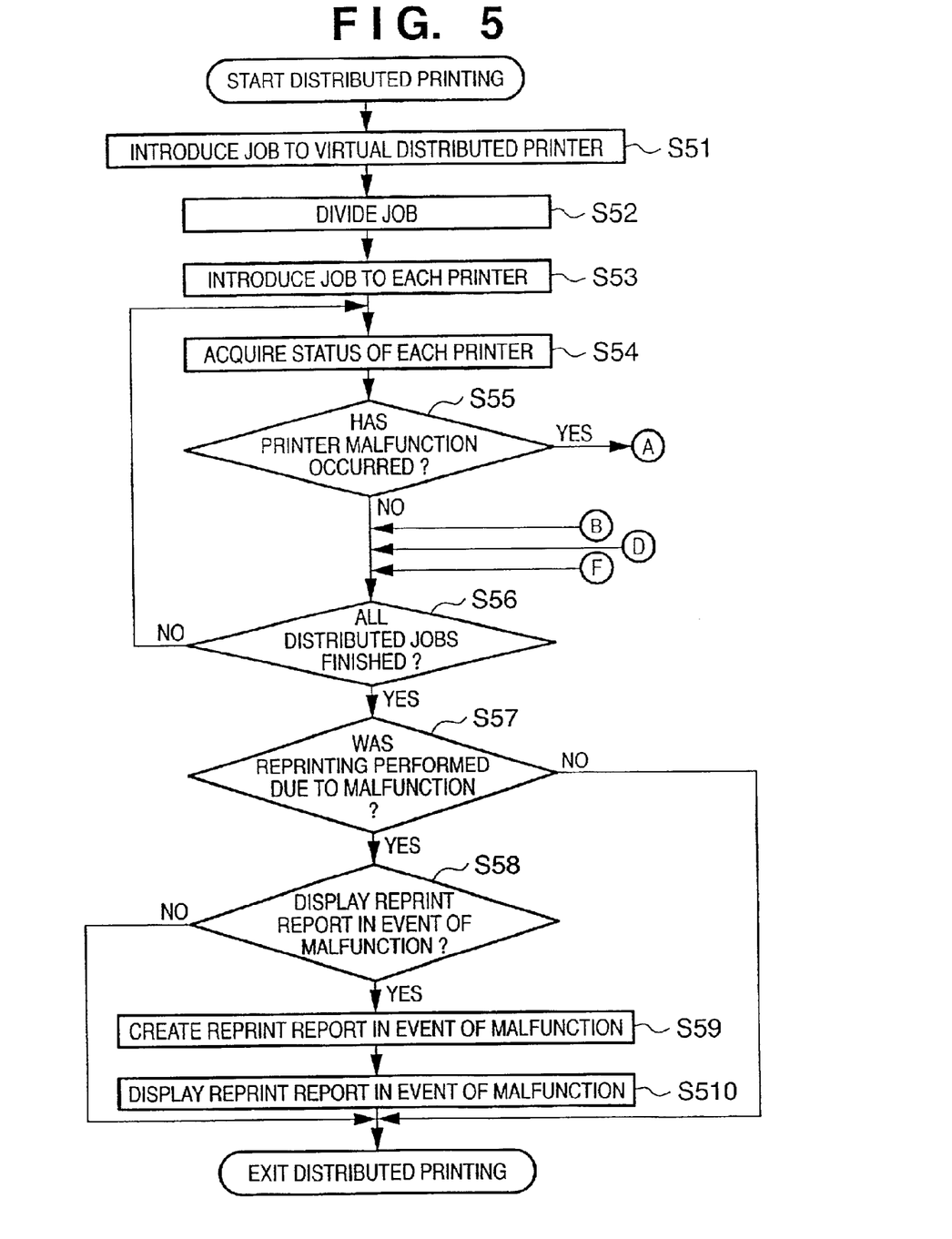
FIG. 5 is a flowchart useful in describing the operation of distributed processing in this embodiment.
Figure 6:
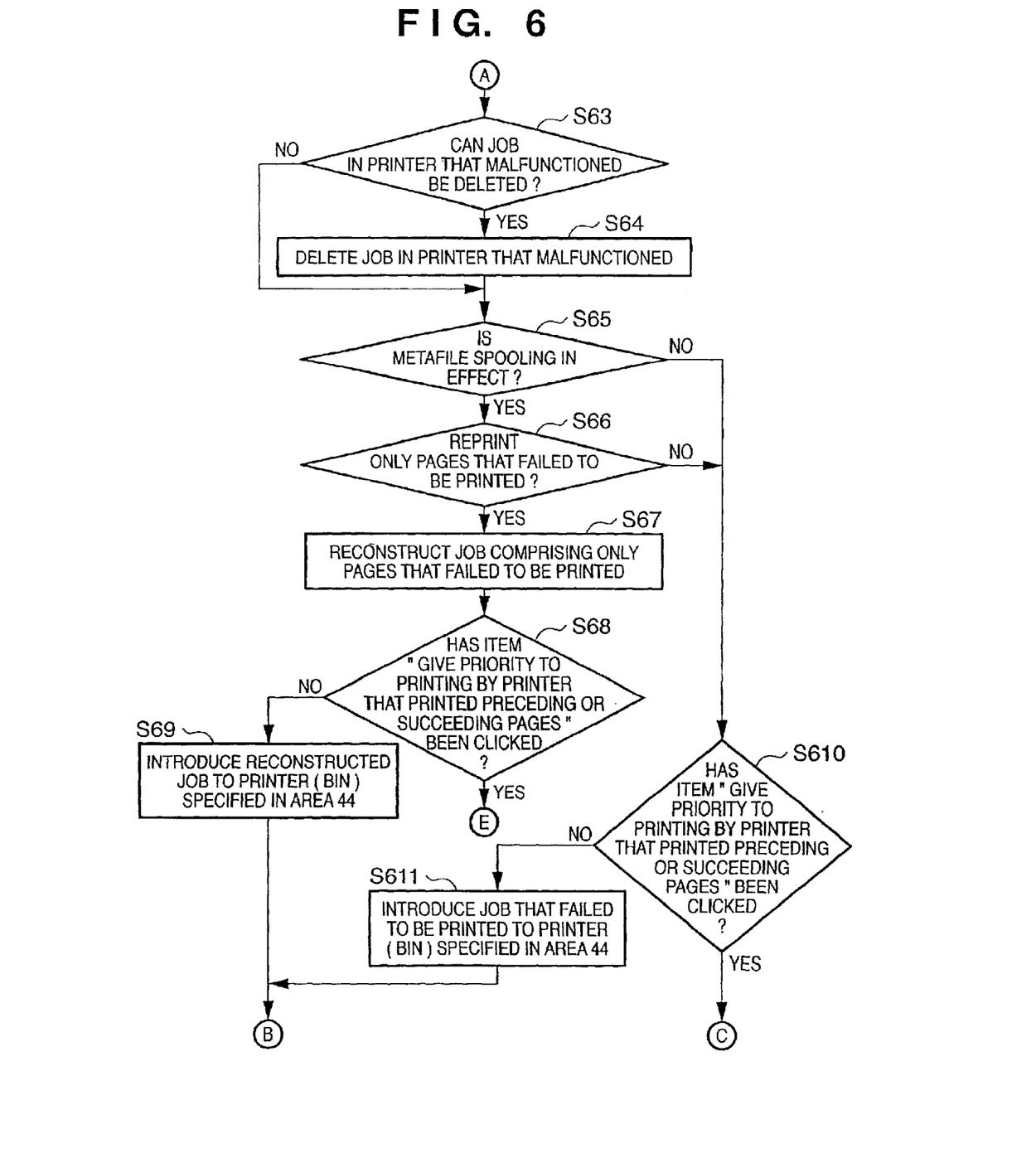
FIG. 6 is a flowchart useful in describing the operation of reprint processing when a malfunction occurs in this embodiment.

FIG. 6 is a flowchart useful in describing processing for performing reprint in the event of printer malfunction when such a malfunction has been verified at step S55 in FIG. 5. It is determined at step S63 whether a distributed job in a printer that has malfunctioned is capable of being deleted. If the job can be deleted, then deletion is performed at step S64. This processing makes it possible to prevent needless printing from being carried out when a printer that malfunctioned has recovered from the malfunction.

This is followed by step S65, at which it is determined whether the format of the spool file is that of a metafile. Control proceeds to step S610 if the spool is not a metafile spool and to step S66 if the spool is a metafile spool. It is determined at step S66 whether the setting of item 41 in FIG. 4 is such that only the page for which printing failed is to be reprinted. If only the page for which printing failed is to be reprinted, control proceeds to step S67. Otherwise, i.e., if all pages that the malfunctioning printer attempted to print are to be reprinted, control proceeds to step S610. At step S67, through use of a method similar to that of step S52, only the page for which printing failed is extracted from the metafile that prevailed prior to the introduction of the distributed job to the faulty printer, and the job (reprint job) is reconstructed.

It is determined at steps S68 and S610 whether "GIVE PRIORITY TO PRINTING BY PRINTER THAT PRINTED PRECEDING OR SUCCEEDING PAGES" has been selected at item 42 in FIG. 4. Control proceeds from step S68 to step S80 in FIG. 8 and from step S610 to step S73 in FIG. 7 if this item has been selected, and from step S68 to step S69 and from step S610 to step S611 if this item has not been selected.

At steps S69 and S611, the reprint job is introduced to the printer or bin specified in area 44 of FIG. 4, after which control returns to step S56 in FIG. 5.

Figure 7:
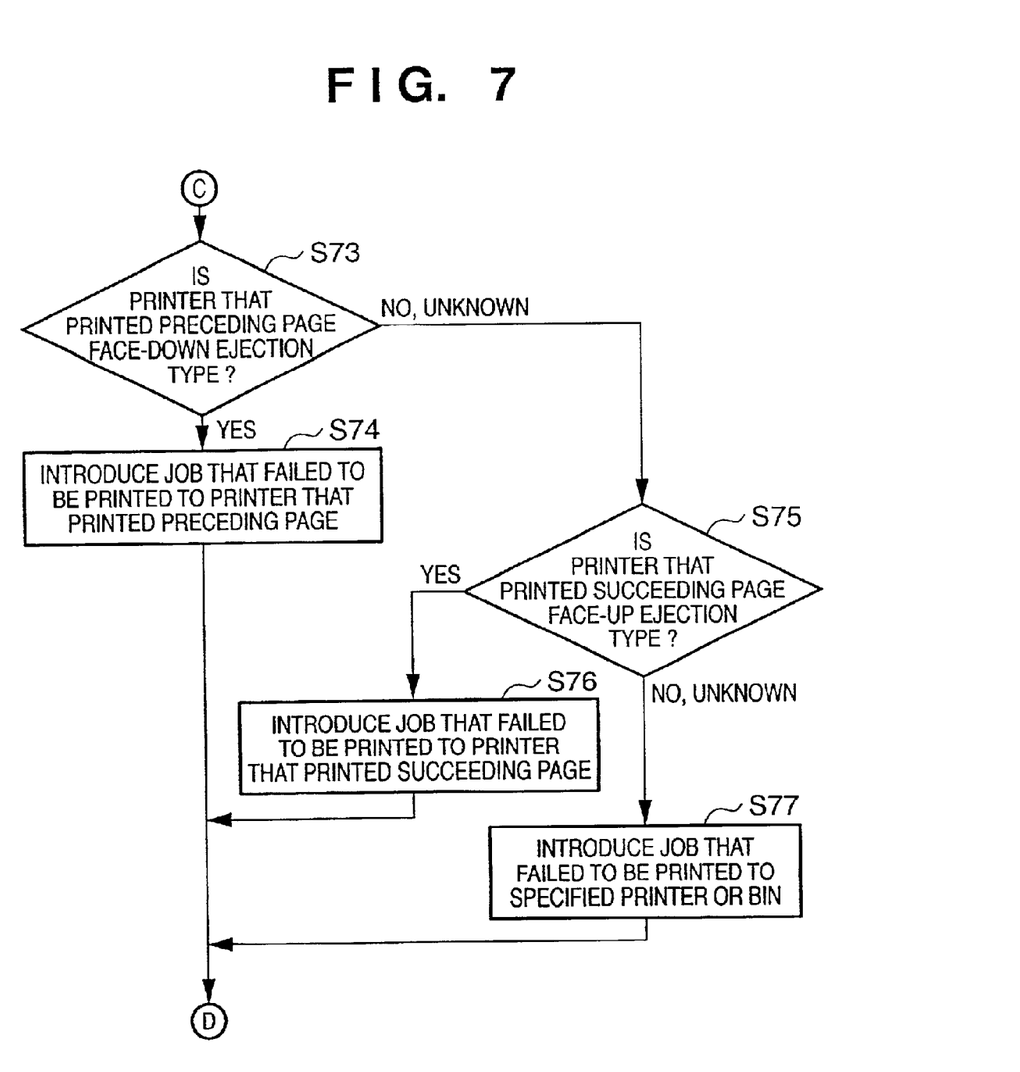
FIG. 7 is a flowchart useful in describing the operation of reprint processing when a malfunction occurs in this embodiment.

FIG. 7 is a flowchart illustrating processing in a case where all pages that were to be printed by a faulty printer are to be reprinted and "GIVE PRIORITY TO PRINTING BY PRINTER THAT PRINTED PRECEDING OR SUCCEEDING PAGES" has been selected at item 42 in FIG. 4.

First, at step S73, the printer that printed the pages preceding the distributed job that was to be printed by the printer that malfunctioned is specified and information concerning the configuration of this printer is acquired, whereby it is determined whether the printer ahead of the faulty printer is of the type that ejects paper face-down. In a case where a distributed job that was to be printed by the faulty printer includes the first page of all pages to undergo distributed printing, it is similarly determined whether the printer that printed the final page is of the type that ejects paper face-down. If the printer that printed the preceding pages is of the face-down ejection type ("YES" at step S73), then the distributed job (reprint job) for which printing failed is introduced to this printer at step S74 and control returns to step S56 in FIG. 5. The introduction of the distributed job in step S74 indicates an operation performed in accordance with information which specifies pages included in the spool file. More specifically, if the printer to which the distributed job is to be introduced ejects paper face-down, then the print data is transferred in the order of pages as stored in the ascending order in non-intermediate format, such as the RAW format. Whereas, if the printer to which the distributed job is to be introduced ejects paper face-up, then the print data is transferred in the opposite order of pages (within the range of pages) stored in the ascending order in the RAW format. Further, in a case where the spooled print data is stored in the descending order of pages, the transferring order in accordance with the paper ejection type is opposite to the order when the pages are stored in the ascending order.

Further, information concerning the configuration (paper ejection type) of a printer may be acquired from the printer each time or at a predetermined timing (polling), acquired from the printer as the printer spontaneously notifies an information processing apparatus of the information concerning the configuration periodically or upon occurrence of a predetermined event (trapping), or acquired by referring to information obtained from the printer or a printer server via a communication line at a predetermined timing under a control of a predetermined program, such as the control program (distributed printing program) of the present invention and a printer driver, installed in an information processing apparatus, and stored in the information processing apparatus.

On the other hand, if the printer that printed the preceding pages is not of the face-down ejection type, i.e., if the printer is of the face-up ejection type, or if the type of printer is unknown because it cannot be detected whether it is of the face-down ejection type ("NO" or "UNKNOWN" at step S73), control proceeds to step S75. Here the printer that printed the pages succeeding the distributed job that was to be printed by the printer that malfunctioned is specified and information concerning the configuration of this printer is acquired, whereby it is determined whether the printer that follows the faulty printer is of the type that ejects paper face-up. In a case where a distributed job that was to be printed by the faulty printer includes the final page of all pages to undergo distributed printing, it is similarly determined whether the printer that printed the first page is of the type that ejects paper face-up. If the printer that printed the succeeding pages is of the face-up ejection type ("YES" at step S75), then the distributed job (reprint job) for which printing failed is introduced to this printer at step S76 and control returns to step S56 in FIG. 5. It should be noted that, in step S76, the similar transfer control as described for step S74 is executed.

Thus, if a printer ahead of the faulty printer is of the face-down ejection type, this printer is caused to perform paper ejection. If a printer following the faulty printer is of the face-up ejection type, then this printer is caused to execute printing of the reprint job and paper ejection. As a result, even if a certain printer develops a malfunction, the user need only collect, in regular order, the printouts ejected by the distributed printing system for which malfunction paper-ejection processing has been implemented. The collected pages will be in the proper order.

On the other hand, if the printer that printed the succeeding pages is not of the type that ejects paper fact-up, or if the type of printer is unknown because it cannot be detected whether it is of the face-up ejection type ("NO" or "UNKNOWN" at step S75), then control proceeds to step S77. Here it is construed that it would be inappropriate to perform reprinting of all pages that were to be printed by the faulty printer by the printers that printed the preceding and succeeding pages. Accordingly, the reprint job is introduced to the printer or bin specified in area 44 of FIG. 4. Control then proceeds to step S56 in FIG. 5.

According to the flowchart shown in FIG. 7, when assigning at least a part of a print job to be printed by a given printer to another printer in accordance with the status (malfunction) of the printer, the other printer can be decided in such a manner that the optimal print job assignment can be achieved in accordance with the paper ejection type of the other printer.

Figure 8:
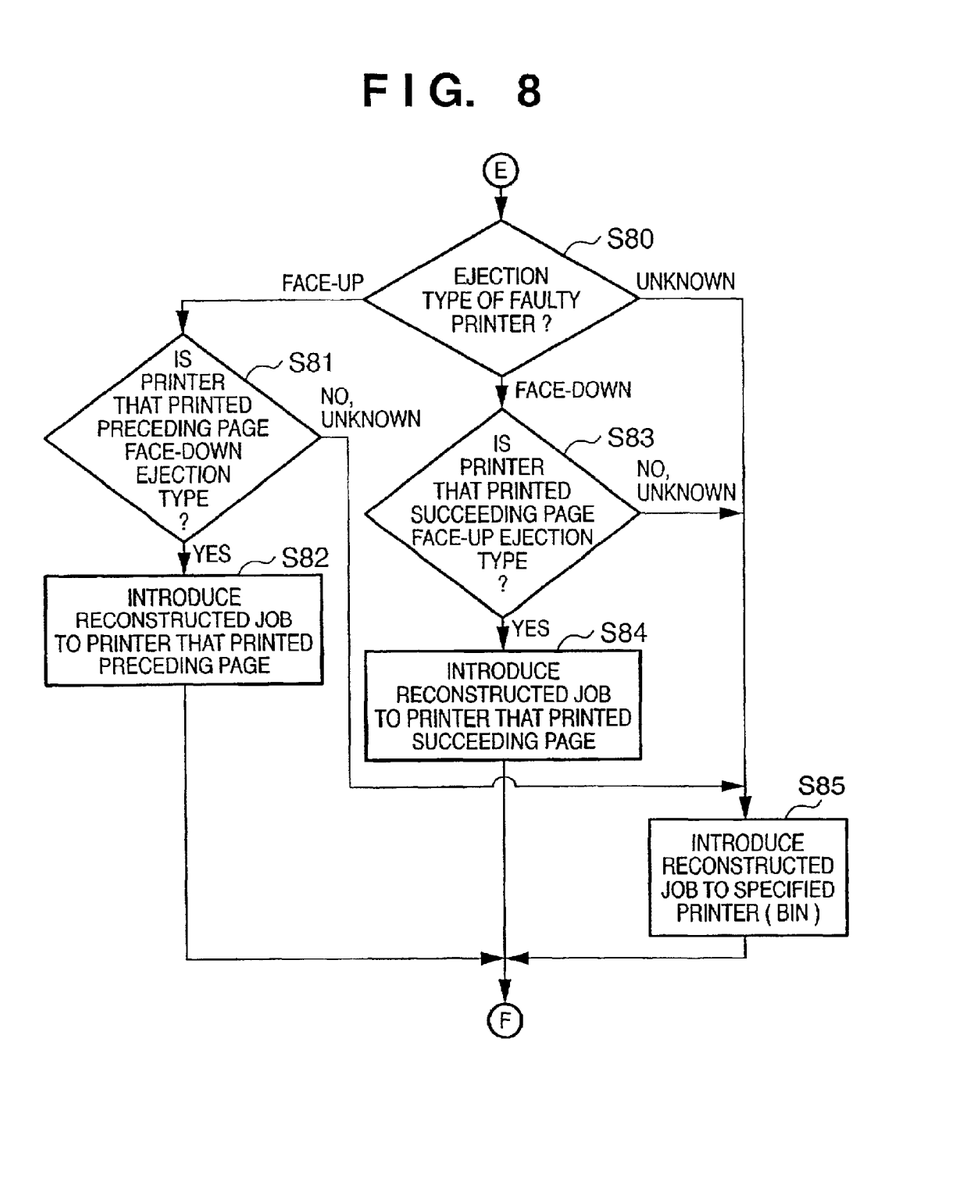
FIG. 8 is a flowchart useful in describing the operation of reprint processing when a malfunction occurs in this embodiment.

FIG. 8 is a flowchart illustrating processing in a case where only a page for which printing failed is to be reprinted from among pages that were to be printed by a faulty printer, and VE PRIORITY TO PRINTING BY PRINTER THAT PRINTED PRECEDING OR SUCCEEDING PAGES" has been selected at item 42 in FIG. 4.

First, at step S80, the type of paper ejection of a faulty printer is determined. If the faulty printer is of the face-down ejection type, the process proceeds to step S81, whereas, if the faulty printer is of the face-up ejection type, the process proceeds to step S83. If the type is not known, then the process proceeds to step S85.

At step S81, it is determined whether a printer that printed pages preceding all pages that were to be printed by a faulty printer is of the face-down ejection type. In a case where a page that was to be printed by the faulty printer includes the first page of all pages to undergo distributed printing, it is determined whether the printer that printed the final page is of the face-down ejection type. If the printer that printed the preceding pages is of the face-down ejection type ("YES" at step S81), then the reprint job reconstructed at step S67 of FIG. 6 is introduced to this printer at step S82.

On the other hand, if the printer that printed the preceding pages is not of the type that ejects paper fact-down, or if the type of printer is unknown because it cannot be detected whether it is of the face-down ejection type ("NO" or "UNKNOWN" at step S81), then control proceeds to step S85.

Whereas, at step S83, it is determined whether a printer that printed pages succeeding all pages that were to be printed by a faulty printer is of the face-up ejection type. In a case where a page that was to be printed by the faulty printer includes the final page of all pages to undergo distributed printing, it is determined whether the printer that printed the first page is of the face-up ejection type. If the printer that printed the succeeding pages is of the face-up ejection type ("YES" at step S83), then the reprint job reconstructed at step S67 of FIG. 6 is introduced to this printer at step S84.

On the other hand, if the printer that printed the succeeding pages is not of the type that ejects paper fact-up, or if the type of printer is unknown because it cannot be detected whether it is of the face-up ejection type ("NO" or "UNKNOWN" at step S83), then control proceeds to step S85. Here it is construed that it would be inappropriate to perform reprinting of all pages that were to be printed by the faulty printer by the printers that printed the succeeding pages. Accordingly, the print job reconstructed at step S67 of FIG. 6 is introduced to the printer or bin specified in area 44 of FIG. 4. Control then proceeds to step S56 in FIG. 5. According to the present invention as described above, whether a printer which prints the succeeding pages or a printer which prints the preceding pages is to be checked is determined on the basis of the paper ejection type, i.e., face-up ejection or face-down ejection, of a malfunctioning printer. Further, information on the paper ejection type of the printer which is determined to be checked is obtained, and the distributed job is reassigned so that the pages of the printouts will be in the proper order. Accordingly, the the collection of printouts obtained by distributed printing is facilitated.

Figure 9:
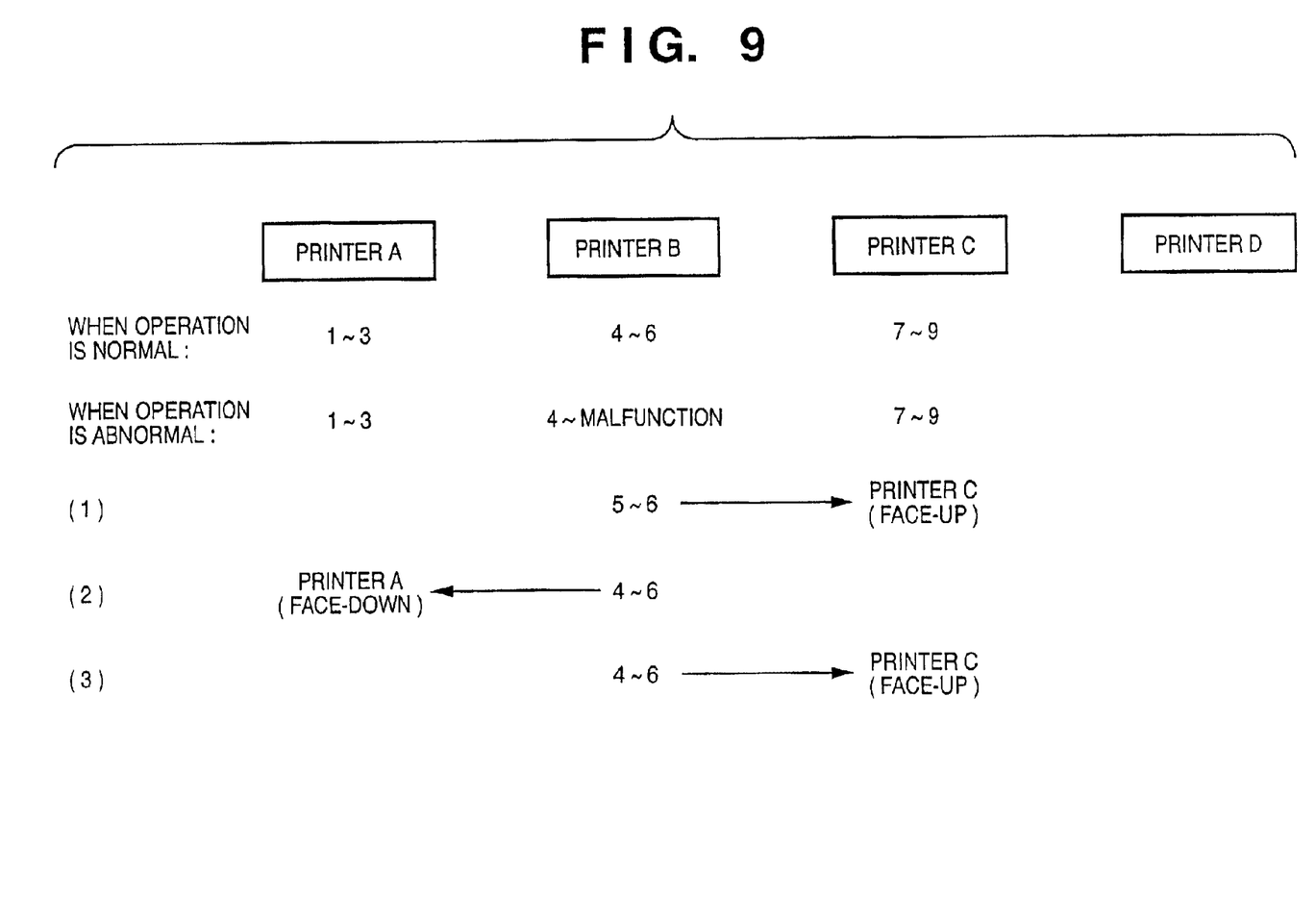
FIG. 9 is a diagram useful in describing output by reprinting when a malfunction occurs in this embodiment.
Figure 10:
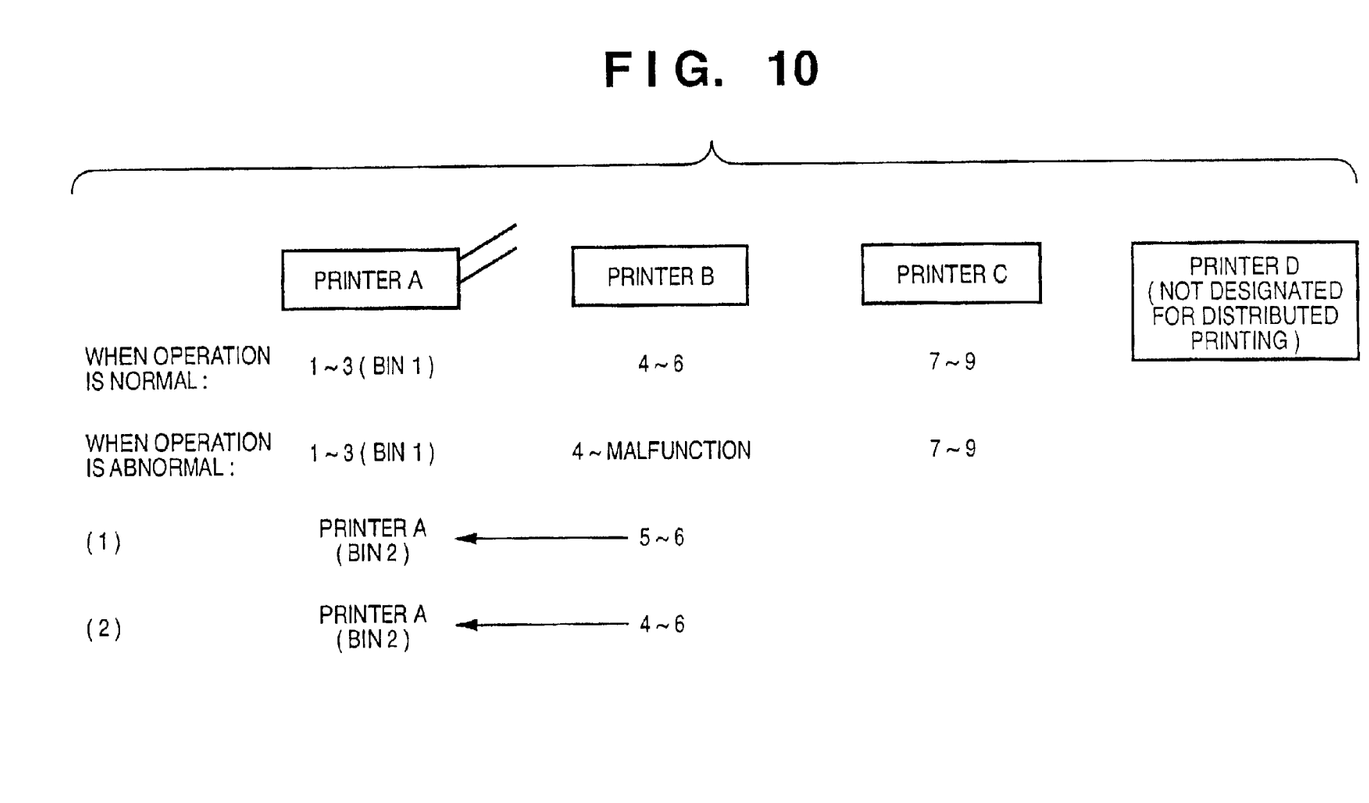
FIG. 10 is a diagram useful in describing output by reprinting when a malfunction occurs in this embodiment.
Figure 11:
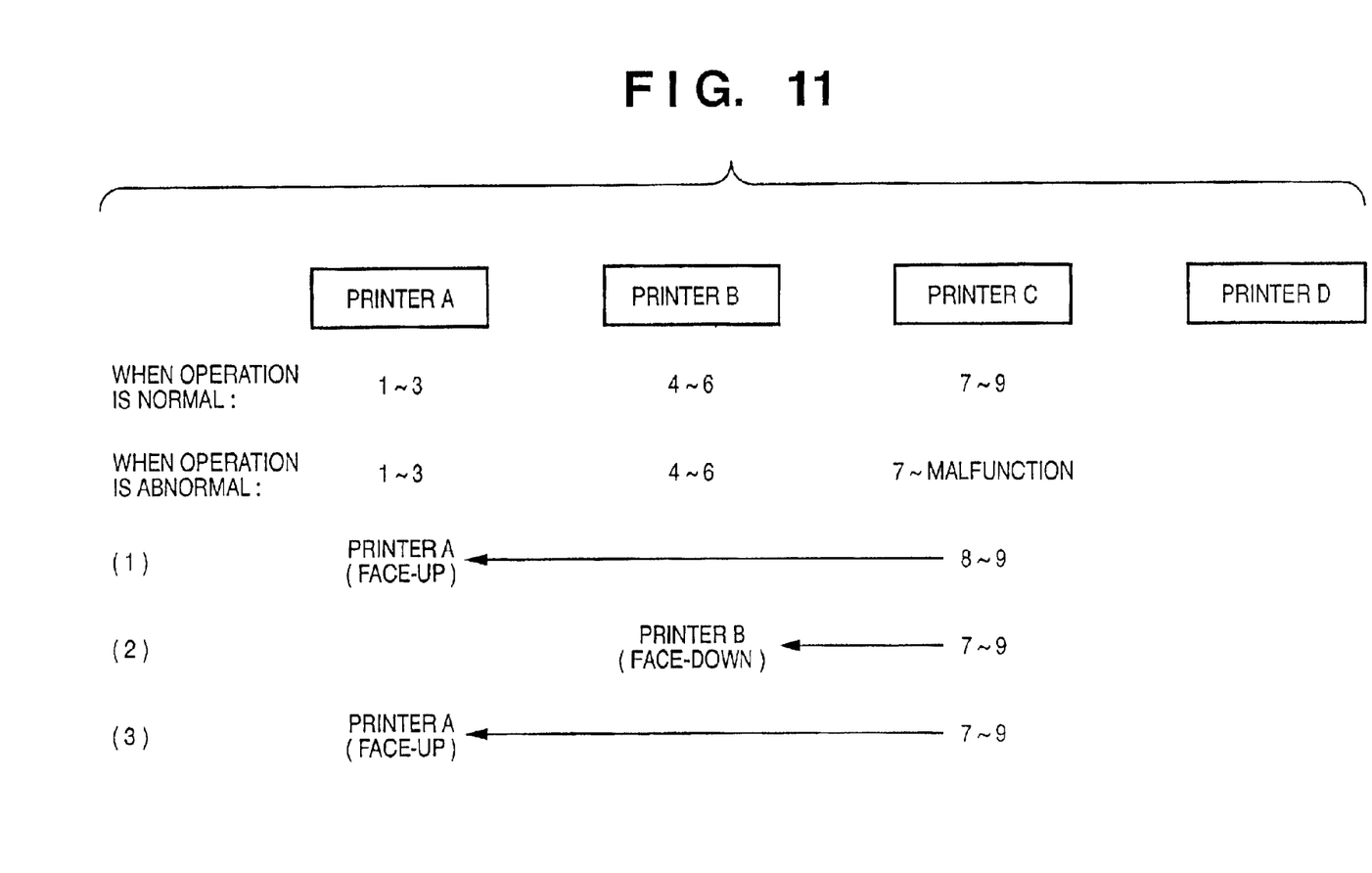
FIG. 11 is a diagram useful in describing output by reprinting when a malfunction occurs in this embodiment.

FIGS. 9 to 11 are diagrams useful in describing output in a case where reprinting is performed based upon the operation described above in conjunction with FIGS. 5 to 8 in the event of a malfunction when the distributed printing system of the present invention is used.

Here it is assumed that a job of nine pages is being output by three printers A to C (13 to 15). Further, it is assumed that a distributed printing algorithm has been configured as shown in FIG. 3. When the printers are operating normally, three pages are printed by each printer in the manner illustrated.

FIGS. 9 and 10 illustrate an instance where printer B (face-down ejection type), which is supposed to print the fourth to sixth pages, malfunctions after printing the fourth page. FIG. 11 illustrates an instance where printer C, which is supposed to print the seventh to ninth pages, malfunctions after printing the seventh page.

If, when a malfunction occurs as shown in FIGS. 9 and 10, metafile spooling is being carried out and it can be detected that printer C is of the type that ejects paper face-up, then the job that includes only the fifth and sixth pages is reconstructed and introduced to printer C, as indicated at (1) in FIG. 9. As a result, pages are output to printer C in the order 5, 6, 7, 8, 9 from top down. Further, if metafile spooling is not being carried out and it can be detected that printer A is of the type that ejects paper face-down, then the job that includes the fourth to sixth pages, which had been introduced to printer B that malfunctioned, is introduced to printer A, as indicated at (2) in FIG. 9. As a result, pages are introduced to printer A in the order 1, 2, 3, 4, 5, 6 from bottom up. Further, if metafile spooling is not carried out, it cannot be detected that printer A is of the type that ejects paper face-down but it can be detected that printer C is of the type that ejects paper face-up, then the job that includes the fourth to sixth pages, which had been introduced to printer B that malfunctioned, is introduced to printer C, as indicated at (3) in FIG. 9. As a result, pages are introduced to printer C in the order 4, 5, 6, 7, 8, 9 from top down.

In a case where printer A is not of the face-down ejection type and printer C is not of the face-up ejection type, processing is executed as follows: If metafile spooling is being carried out, then the job that includes only the fifth and sixth pages is reconstructed and is re-introduced to bin 2 of printer A specified in setting area 44 of FIG. 4, as indicated at (1) in FIG. 10. If metafile spooling is not being carried out, then the job that includes the fourth to sixth pages, which had been introduced to printer B that malfunctioned, is re-introduced to bin 2 of printer A, as indicated at (2) in FIG. 10.

A case of introducing a job to bin 2 of printer A was described with reference to (1) and (2) in FIG. 10, however, bin or printer to which the job is introduced is not limited to bin 2 of printer A. For instance, if printer D is set in the item 43 in FIG. 4, the destination of the job is set to printer D at (1) and (2) in FIG. 10. Furthermore, if any bin of printer D is designated in item 43 of the user interface shown in FIG. 4, the job is introduced to the designated bin of printer D at (1) and (2) in FIG. 10.

Further, in a case where the operation as indicated at (2) in FIG. 9 is performed when print data of the RAW format is stored in the ascending order (1, 2, 3, . . . ), the print data is transferred to printer A in the order as stored. Whereas, in a case where the operation as indicated at (3) in FIG. 9 is performed when the print data of the RAW format is stored in the ascending order, the control program of the present invention recognizes information on page break and layout contained in the data of the RAW format, and changes the order of pages from the ascending order to the descending order on the basis of the recognized information on page break and layouts. Thereafter, the print data is transferred to printer C.

Further, the paper ejection type of printer B in FIG. 9 is not limited to the face-down ejection type, and may be the face-up ejection type. Furthermore, the present invention is not limited to a case where the data stored in the information processing apparatus is in the ascending order. If the stored data is in the descending order, print data is transferred to a destination printer in the page order or in the order opposite to the page order depending upon the paper ejection type, i.e., face-up ejection type or face-down ejection type, of the destination printer.

Next, control is exercised as follows when a malfunction occurs after the seventh page is printed by printer C, which prints pages that include the final page of the entire document: If metafile spooling is being carried out and it can be detected that printer A is of the type that ejects paper face-up, then the job that includes only the eighth and ninth pages is reconstructed and introduced to printer A, as indicated at (1) in FIG. 11. As a result, pages are output to printer A in the order 8, 9, 1, 2, 3 from top down. Although work to sort the printouts is not non-existent, the task is very easy to perform. Further, if metafile spooling is not being carried out and it can be detected that printer B is of the type that ejects paper face-down, then the job that includes the seventh to ninth pages, which had been introduced to printer C that malfunctioned, is introduced to printer B, as indicated at (2) in FIG. 11. As a result, pages are introduced to printer B in the order 4, 5, 6, 7, 8, 9 from bottom up. If it cannot be detected that printer B is of the type that ejects paper face-down but it can be detected that printer A is of the type that ejects paper face-up, then the job that includes the seventh to ninth pages, which had been introduced to printer C that malfunctioned, is introduced to printer A, as indicated at (3) in FIG. 11. As a result, pages are introduced to printer A in the order 7, 8, 9, 1, 2, 3 from top down. In a case where neither of the above applies, the job is re-introduced to bin 2 of printer A, which was specified in setting area 44 of FIG. 4, in a manner similar to that of the case described above in connection with FIG. 10.

In the operation as indicated at (2) in FIG. 11, if the data of the RAW format stored in printer C is in the ascending order of pages (1, 2, 3, . . . ), since destination printer B ejects paper face-down in the ascending order 4, 5, 6, print data is transferred in the ascending order of pages. Further in the operation as indicated at (3) in FIG. 11, since destination printer C ejects paper face-up in the descending order 3, 2, 1, the print data is changed from the ascending order to the descending order and then transferred to the printer C.

It should be noted that printer C is assumed to be of the face-down ejection type in FIG. 11 similarly to FIG. 9. However, the present invention is not limited to this, and printer C may be the face-up ejection type.

Further, in FIG. 11, the distributed job assigned to the malfunctioning printer is assumed to include the final page of the print job prior to its division. Whereas, if the distributed job assigned to the malfunctioning printer includes a first page of the print job prior to its division (printer A in FIG. 11), and printer B ejects paper face-up in the operation as indicated at (2) in FIG. 11, or printer C ejects paper face-down in the operation as indicated at (3) in FIG. 11, reassignment of distributed job is performed as explained with reference to FIG. 11.

<Second Embodiment>

As another embodiment, when it is determined as YES at step S65 in the flowchart shown in FIG. 6, processes at steps S66 and S67 may be skipped and the processing explained with reference to FIG. 7 may be performed instead of the processing of the flowchart shown in FIG. 8 when it is determined as YES at step S68.

This corresponds to a case where the spool file has a format such as EMF format and all of the pages of the distributed job is subject to the reassignment. In this case, data introduced in the operation as indictated in FIG. 7, (2) and (3) in FIG. 9, (1) in FIG. 10, and (2) and (3) in FIG. 11 is replaced by data of intermediate file format such as EMF format.

According to the control of the second embodiment, it is possible to simplify the designing of the system as well as maintain the order of the pages of the distributed job in each printer As a result, the collection of printouts obtained by distributed printing is facilitated.

The aforesaid first and second embodiments describe distributed jobs obtained by dividing a single print job for a plurality of ranges of pages. However, the present invention is not limited to this and applicable to a variety of print jobs accompanied by distributed printing by number of copies or other substitute processes. For instance, for controlling each of three printers (printer A of the face-down ejection type, printer B of the face-down ejection type, and printer C of the face-up ejection type) to perform distributed printing to print 3 copies, when a mulfunction occurs in printer B during printing the third copy, printer C is controlled to print one more copy in place of printer B. This control facilitates the collection of the printouts produced by printers A, B and C.

In accordance with the embodiment as described above, the following advantages are obtained:

(1) By outputting a page for which printing has failed to any bin of any designated printer or to a printer other than one specified for distributed printing, it is possible to prevent mixing of the type in which a page that is reprinted becomes mixed in with other pages.

(2) A job for which printing has failed is re-introduced to a printer that output the preceding pages of the document. Further, if printing of a job that includes the first page fails, then the job is re-introduced to the printer that output the final page. As a result, the collection of printouts obtained by distributed printing is facilitated and the order of the pages is maintained. This makes sorting very easy.

(3) A job for which printing has failed is re-introduced to a printer that output the succeeding pages of the document. Further, if printing of a job that includes the final page fails, then the job is re-introduced to the printer that output the first page. As a result, the collection of printouts obtained by distributed printing is facilitated and the order of the pages is maintained. This makes sorting very easy.

(4) Whether a printer is of the face-up ejection type or face-down ejection type is detected and a job is re-introduced to whichever printer is appropriate of the printers that output the pages before or after all pages that were to be output to the printer that malfunctioned. As a result, it is possible to assure that the pages of the printouts will be in the proper order, the collection of printouts obtained by distributed printing is facilitated and so is sorting.

(5) A print job comprising only pages for which printing failed is generated and printing is performed again. This makes it possible to avoid multiple printing of the same page. Furthermore, the type of paper ejection of a printer which developed a malfunction is determined, and if it is of the face-up ejection type, then it is determined whether a printer that output the preceding part of a job is of the face-down ejection type. If this printer is of the face-down ejection type, then this printer is made the destination of printing. Whereas, if printer which developed the malfunction is of the face-down ejection type, then it is determined whether a printer that output the latter part of a job is of the face-up ejection type. If this printer is of the face-up ejection type, then this printer is made the destination of printing. This facilitates the collection and sorting of printouts.

Thus, as described above, there can be provided a distributed printing system for performing distributed printing by a plurality of printers or devices having a printer function, wherein the system is controlled in such a manner that printouts can be collected and put into proper order easily even in a case where a problem has occurred in any of the printers or devices during printing.

<Other Embodiment>

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts shown in FIGS. 5 to 8 described in the embodiment.

The present invention is not limited to the above embodiments and various changes and modifications can be made within the spirit and scope of the present invention. Therefore to apprise the public of the scope of the present invention, the following claims are made.

What is claimed is:

1. A control method for a distributed printing system comprising:
   an acknowledging step, of acknowledging paper ejection type of a plurality of available printing apparatuses;
   an assigning step, of dividing a print job into a plurality of divided print jobs and assigning the plurality of print jobs to the plurality of printing apparatuses;
   a recognition step, of recognizing a status of the plurality of printing apparatuses; and
   a decision step, of, in a case of assigning at least part of the divided print job initially assigned to a first printing apparatus among the plurality of printing apparatuses to a second printing apparatus in accordance with the status recognized in said recognition step, deciding the second printing apparatus from among the plurality of printing apparatuses to which the print job is assigned in accordance with the paper ejection type of the plurality of available printing apparatuses.

2. A control method according to claim 1, wherein the paper ejection type represents a direction of a surface of ejected paper, and the direction is face-up or face-down.

3. A control method according to claim 1, wherein paper ejection type is an output order of pages, and the output order is ascending or descending.

4. A control method according to claim 1, further comprising a determination step, of, in a case of assigning at least part of the divided print job initially assigned to the first printing apparatus to the second printing apparatus in accordance with the status recognized in said recognition step, determining whether a printing apparatus which prints pages preceding to the divided print job assigned to the first printing apparatus produces a face-down output,
   wherein if an affirmative decision is rendered in said determination step, then in said decision step, the printing apparatus subjected to the determination is decided as the second printing apparatus.

5. A control method according to claim 4, wherein if the divided print job includes the first page of the print job prior to its division, then determination on a printing apparatus that prints the divided print job including the final page of the print job is performed in said determination step instead of the printing apparatus that prints the preceding pages.

6. A control method according to claim 1, further comprising a determination step, of, in a case of assigning at least part of the divided print job initially assigned to the first printing apparatus to the second printing apparatus in accordance with the status recognized in said recognition step, determining whether a printing apparatus which prints pages following the divided print job assigned to the first printing apparatus produces a face-up output,
   wherein if an affirmative decision is rendered in said determination step, then in said decision step, the printing apparatus subjected to the determination is decided as the second printing apparatus.

7. A control method according to claim 6, wherein if the divided print job includes the final page of the print job prior to its division, then determination on a printing apparatus that prints the divided print job including the first page of the print job is performed in said determination step instead of the printing apparatus that prints the following pages.

8. A control method according to claim 1, further comprising a detection step, of in a case of assigning at least part of the divided print job initially assigned to the first printing apparatus to the second printing apparatus in accordance with the status recognized in said recognition step, detecting a page or pages which have been printed by the first printing apparatus,
   wherein, the divided print job initially assigned to the first printing apparatus except the page or pages which have been printed in the first printing apparatus is reassigned to the second printing apparatus.

9. A control method according to claim 1, wherein the status is an abnormal state in the printing apparatus, and the abnormal state includes at least either of depletion of paper and power off state.

10. A control method according to claim 1, wherein, in a case where the print job is generated based on an intermediate file, the part of the divided print job corresponds to pages which have not been successfully printed by the first printing apparatus and, in said decision step, the second printing apparatus to which the part of the divided print job is assigned is decided in accordance with the paper ejection type of the first printing apparatus and the paper ejection type of the other printing apparatuses.

* * * * *

UNITED STATES PATENT AND TRADEMARK OFFICE
CERTIFICATE OF CORRECTION

PATENT NO. : 6,941,865 B2  Page 1 of 1
APPLICATION NO. : 09/981821
DATED : September 13, 2005
INVENTOR(S) : Kazunori Kato It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (356) days Delete the phrase "by 356 days" and insert – by 476 days--

Signed and Sealed this

First Day of August, 2006

JON W. DUDAS
*Director of the United States Patent and Trademark Office*